E. P. BULLARD, Jr. & W. N. STEVENS.
FEED WORKS FOR MACHINE TOOLS.
APPLICATION FILED DEC. 31, 1915.

1,285,019.

Patented Nov. 19, 1918.
7 SHEETS—SHEET 1.

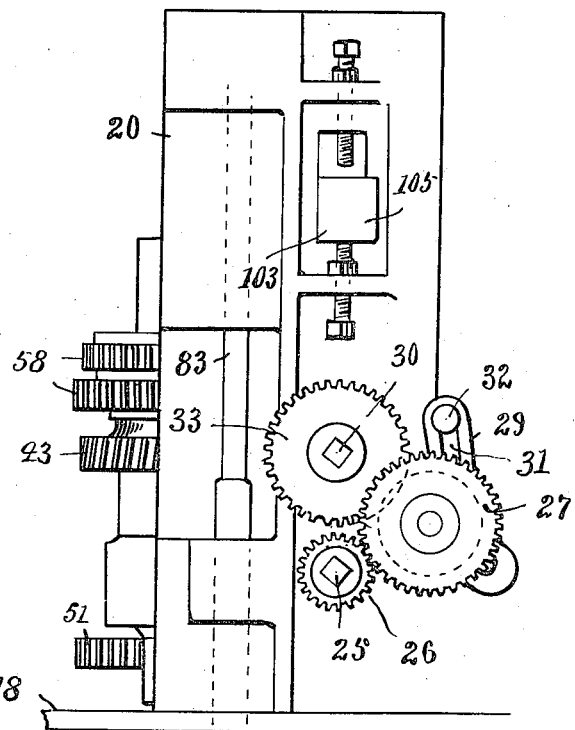
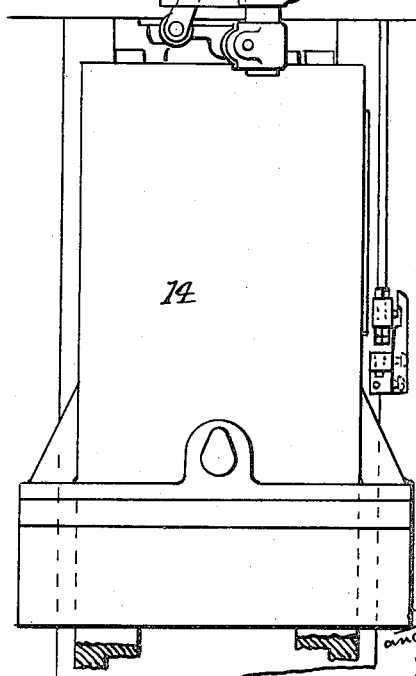

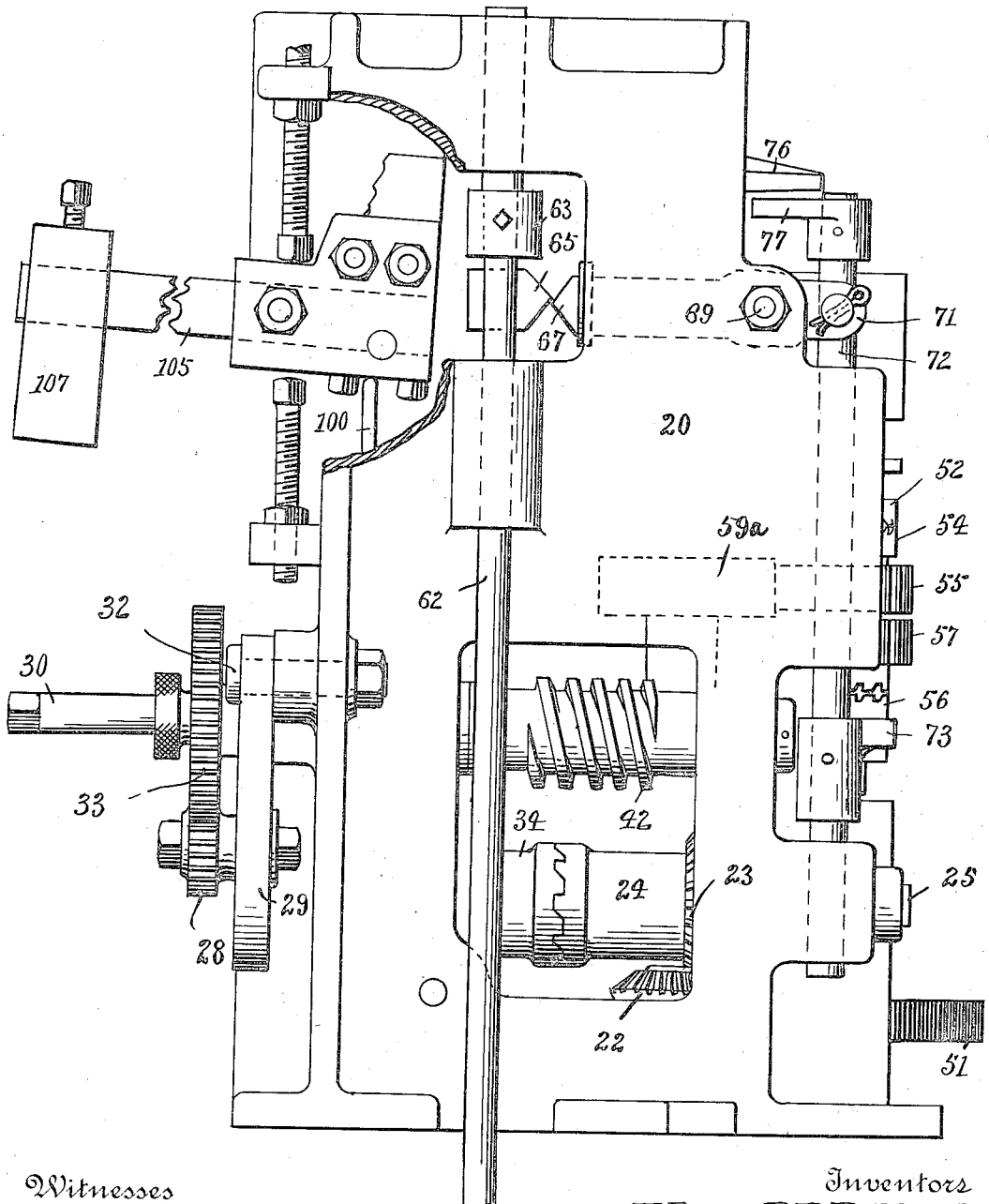

E. P. BULLARD, Jr. & W. N. STEVENS.
FEED WORKS FOR MACHINE TOOLS.
APPLICATION FILED DEC. 31, 1915.

1,285,019.

Patented Nov. 19, 1918.
7 SHEETS—SHEET 4.

Witnesses
Ivan L. Morehouse
Ruth M. H. Koger

Inventors
Edward P. Bullard
and William N. Stevens
By Chamberlain & Newman
Attorneys E. P. BULLARD, Jr. & W. N. STEVENS.
FEED WORKS FOR MACHINE TOOLS.
APPLICATION FILED DEC. 31, 1915.

1,285,019.

Patented Nov. 19, 1918.
7 SHEETS—SHEET 7.

Witnesses

Inventors
Edward P. Bullard Jr.
and William N. Stevens
Chamberlain & Newman
Attorneys

UNITED STATES PATENT OFFICE.

EDWARD P. BULLARD, JR., AND WILLIAM N. STEVENS, OF BRIDGEPORT, CONNECTICUT, ASSIGNORS TO THE BULLARD MACHINE TOOL COMPANY, OF BRIDGEPORT, CONNECTICUT, A CORPORATION OF CONNECTICUT.

FEED-WORKS FOR MACHINE-TOOLS.

1,285,019.  Specification of Letters Patent.  Patented Nov. 19, 1918.

Application filed December 31, 1915. Serial No. 69,531.

*To all whom it may concern:*

Be it known that we, EDWARD P. BULLARD, Jr., and WILLIAM N. STEVENS, citizens of the United States, and residents of Bridgeport, in the county of Fairfield and State of Connecticut, have invented certain new and useful Improvements in Feed-Works for Machine-Tools, of which the following is a specification.

This invention relates to new and useful improvements in feed works for machine tools and refers particularly to mechanism for operating the head that carries the cutting tools.

While the feed works is susceptible of a wide application to machines of various types, yet it will be seen that it is illustrated in connection with a novel type of multiple spindle machine of the general type and character shown and described in a prior application on a multiple spindle machine #811,198 filed Jan. 9, 1914. This feed works is particularly useful in connection with a machine of this type or in fact any machine which includes an operatable tool carrying slide that is adapted to be operated by a feed screw, as is the case with this machine, which is now commercially known as the Mult-Au-Matic.

The purpose of this invention is to provide an improved design of feed works which does not alone perform a simple feeding operation of the tool carrying slides, but one which includes a quick forward movement of the feed screw to bring the cutting tool in position for operation; and which further comprises means for then connecting the feed for the cutting tool; further to provide automatic means for tripping the operating or cutting feed when its work is completed and quickly returning the slide to its starting position preparatory to a further operation.

A further object of the invention is to overcome objections now existing in other forms of feeds, whereby a more powerful and rigid feed may be had including the use of change gears, affording an opportunity for cutting exact pitches, and the ability to operate said feed works by hand independent of the other feed works on the machine sending it through all or part of its cycle of operations as occasion requires, finally to provide a load weighing or regulating device whereby the load under which the head is feeding may be predetermined and set to insure uniform operations, and further to provide means whereby an excessive load will engage the clutch to return the head to its position of rest. To provide a screw feed operated by clutches which is rigid and satisfactory, and so that the engagement and disengagement of the clutches may vary with the load under which the head is working; to provide means whereby the head may be fed to a predetermined point within a degree of accuracy in feeding and returning, which has not heretofore been accomplished.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a front perspective view of an improved form of multiple spindle machine, such as my novel feed works are adapted to be used with.

Fig. 2 shows an enlarged front elevation of a part of the machine shown in Fig. 1 and particularly one of the feed slides and its connections with one of the feed works located within the inclosure shown at top of Fig. 1.

Fig. 3 shows an enlarged side view of the feed works as seen from the right of Fig. 2.

Fig. 9 shows a sectional detail of the ratchet pin and connections for operating same, as seen from arrow *a* in Fig. 6.

Figure 1:
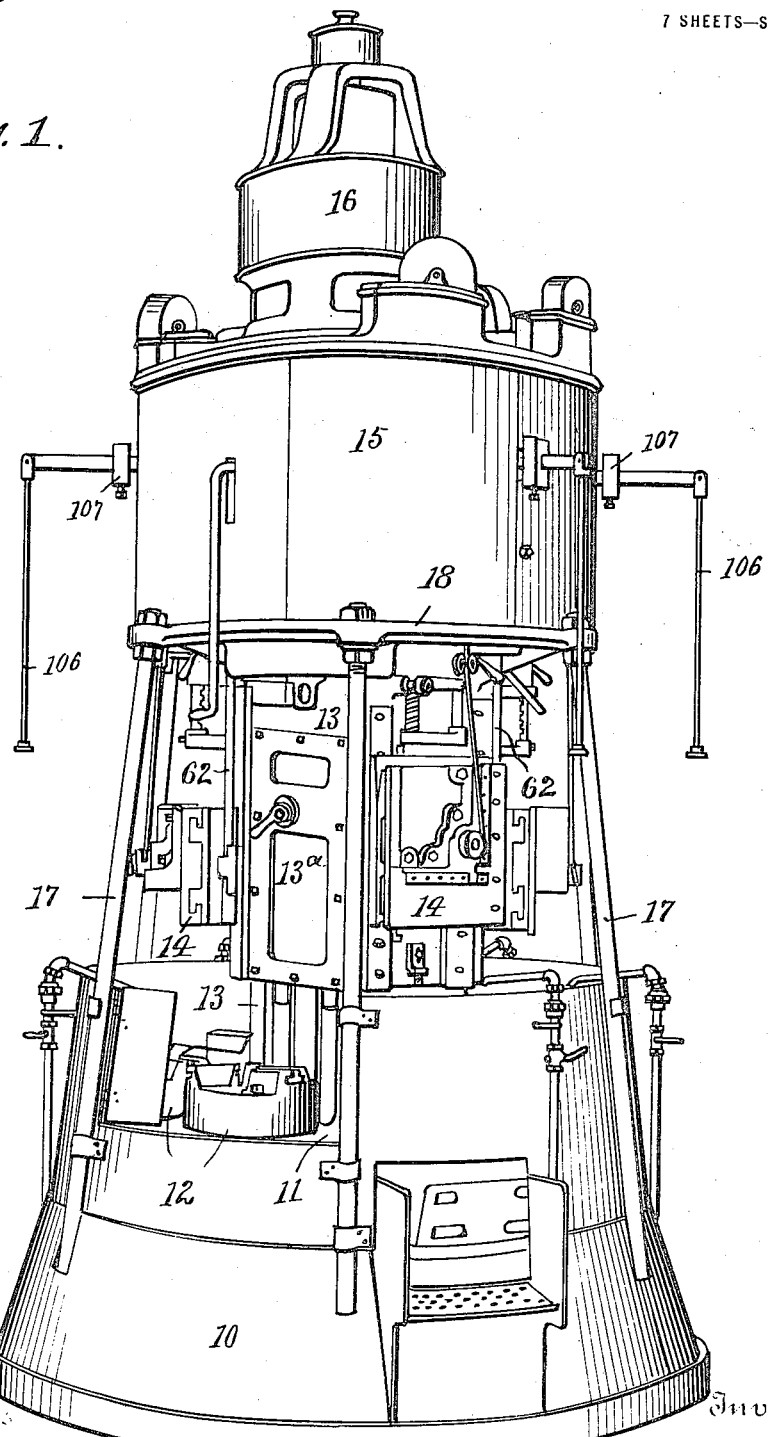
Figure 4:
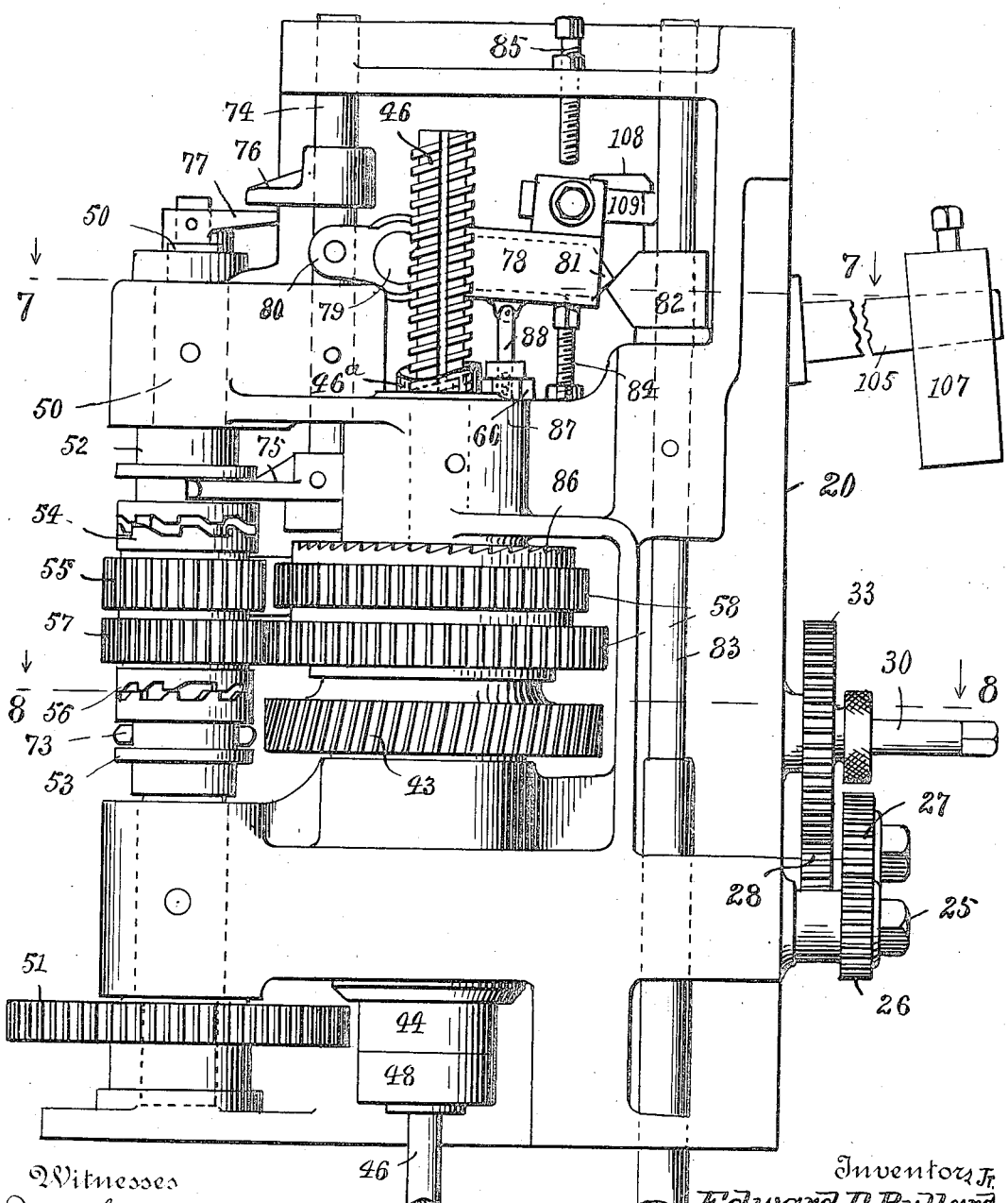
Fig. 4 shows a further side view of the feed works as seen from the opposite side of Fig. 3.

As will be noted the feed works, in Fig. 1, have been shown applied to a commercial type of multiple spindle machine which is obviously done for the purpose of illustrating a suitable application of the invention so that a proper understanding of its operation may be had, and in fact a machine to which it is particularly well adapted. The device, however, can be employed on other types of machines where it is desirable to automatically operate movable tool carrying slides and where the pressure upon the drill or cutting tool is to be regulated and limited. The multiple spindle machine shown in Fig. 1 includes a number of these feed works and slides and also a number of rotary tables that are journaled in a rotary carrier mounted upon the base of the machine.

In order that a better understanding may be had of the multiple spindle machine referred to and the application of the novel feed works thereto, I will first briefly describe the more essential features of this machine and later describe in detail the various features of the feed works.

Referring first to Fig. 1,—10 represents the base of the machine, 11 a rotary carrier mounted thereon,—12 a series of rotatable work carrying tables,—13 a central column upon which a series of vertically movable feed slides 14 are mounted. In the design of machine shown there are five of these slides and six of the tables, there being one more table than slide. The particular part of the column designated as 13ª represents the front of the machine and in line with which one of the rotary tables comes to a position of rest. This table when in this position remains idle so that the operator may remove the finished work and replace the new work, to be operated upon. In the construction of this machine there is one set of feed works employed for each slide, each of the said feed works being located immediately above the slide and within the inclosure designated as 15. 16 indicates the motor which serves to operate the machine, said motor being connected with a central driving shaft that extends down through the machine and is connected with the various parts thereof. 17 represents brace rods one end of which is connected to the base and the other to the bed 18 that is mounted upon the column and serves to support the several feed works as well as the casing 15 inclosing the same. In this particular machine the several slides are all arranged to start on their downward movement together, and at proper instances are tripped and returned to their starting point, though they do not necessarily all return at the same instant. The slides, however, do not start to advance again on their further operations until the last slide has returned to its upper position, but then all start again together. The operation of the slides is therefore automatic and as will later be more fully explained they are all controlled by the feed works comprising the essence of this invention.

In Fig. 2 is shown a partial connection between the feed works and the slide and whereby the connections for tripping the slide can perhaps best be followed.

Figure 5:
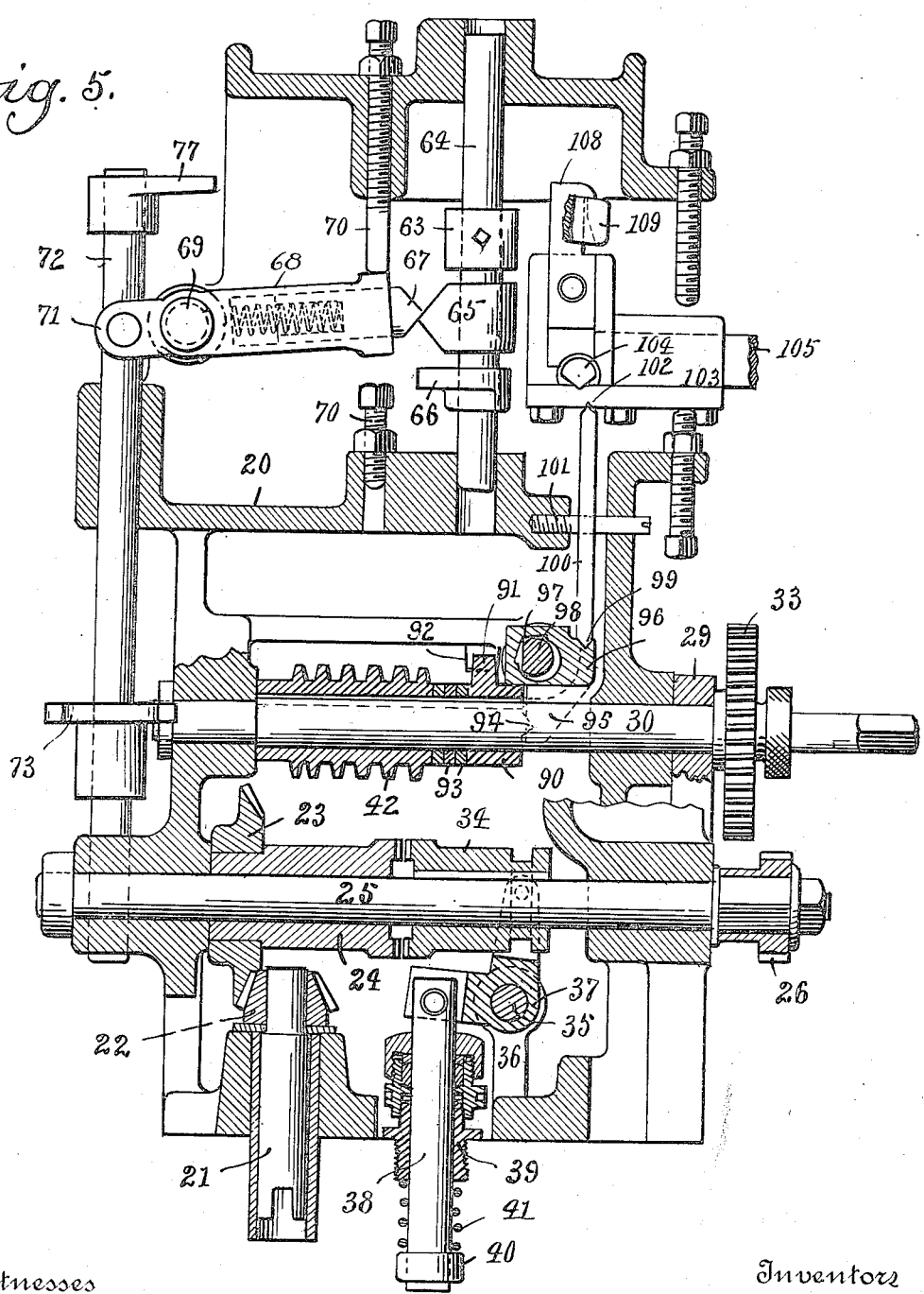
Fig. 5 shows a vertical sectional view through the feed works, taken on line 5—5 of Fig. 7.

Referring now more particularly to the novel form of feed works, attention is first directed to Fig. 5 wherein the connection for operating the feed works is most clearly shown. In this, as well as the other views, 20 represents the frame in which the various parts of the feed works are contained. This frame in practice is suitably secured to the bed 18 before mentioned and as before suggested is arranged immediately above and in line with the slides. 21 represents a short shaft which is suitably coupled and connected with the driving mechanism of the multiple spindle machine whereby a continuous drive of the beveled pinion 22 and its connected beveled gear 23 and clutch member 24 is obtained. The latter pinion and its clutch members are mounted upon a shaft 25 that is journaled in bearings of the frame 20. Upon the outer or forward end of this shaft is mounted a pinion 26 that connects with and drives an idler pinion 27 mounted upon a sleeve carrying a small idler pinion 28. Both of these gears are carried upon the bracket 29 pivotally hung upon a worm shaft 30. This bracket is provided with a slot 31 and a clamping screw 32 whereby it may be adjusted to provide for the change in size of idler pinions. The gear 28 meshes with and drives a fourth gear 33 mounted upon the before mentioned worm shaft 30. These several gears obviously constitute the feed change gears and are so arranged as to permit of their removal and substitution of others as occasion may require in order to change the ratio of the feed of the slide.

Upon the before mentioned shaft 30 is also mounted a slidable clutch member 34 which is normally in engagement with the associate clutch member 24 mounted upon the same shaft, but which is automatically disengaged to throw out the feed when the slide is returned to its upper or normal position. The mechanism for operating this clutch member is best shown in Fig. 5 and as will be noted includes a short shaft 35 journaled in bearings 36 and carries a bell crank lever 37 one arm of which forms a fork to straddle the clutch 34 and bears pins to engage the groove of said clutch. The other arm of the bell crank lever is operatively connected to an operating member 38 which is slidably mounted in bushed bearings 39 attached to the frame 20, and is provided with a collar 40 against which one end of a spring 41 abuts, the other end of said spring being seated against the bushings 39 so as to normally hold the member 38 in a downwardly extended position. In practice the slide 14 which is indicated in this view engages the lower end of this member 38 on its upward movement when nearing its elevated position and forces the member up in a way to throw the bell crank lever and release the clutch, it being obvious that the moment the slides begin to move down the clutch is again engaged through the action of the spring.

The worm shaft 30 is journaled in the frame immediately above the clutch shaft and carries a worm 42. This worm in turn is operatively connected with a worm gear 43 mounted upon a vertically arranged sleeve 44 that is journaled in a suitable bearing 45 of the frame. This line of connection is obviously for the purpose of imparting a vertical movement to the tool slide which is operated through a suitable feed screw 46 that is indirectly connected to said worm and gear just referred to. The further connection for operating the slides through this worm gear includes a nut 47 which is mounted in the sleeve and keyed thereto so as to be rotated thereby. A collar 48 is threadably attached to the lower end of this nut and in practice is adjusted to engage the lower end of the sleeve so as to take care of the upward thrust of the screw. The feed screw 46 is threadably mounted within the nut so that a turning of the nut will feed the screw down. The lower end of this screw is connected with a lug 49 mounted upon the back of the slide proper.

From the foregoing description it will be noted that the feed screw is provided with connections for moving it and the slide down which obviously represents the operative feed of the slide. A different mechanism, however, is employed for raising the slide. This is accomplished by turning the screw within the nut through a different set of connections, as will later be more fully described.

Figure 6:
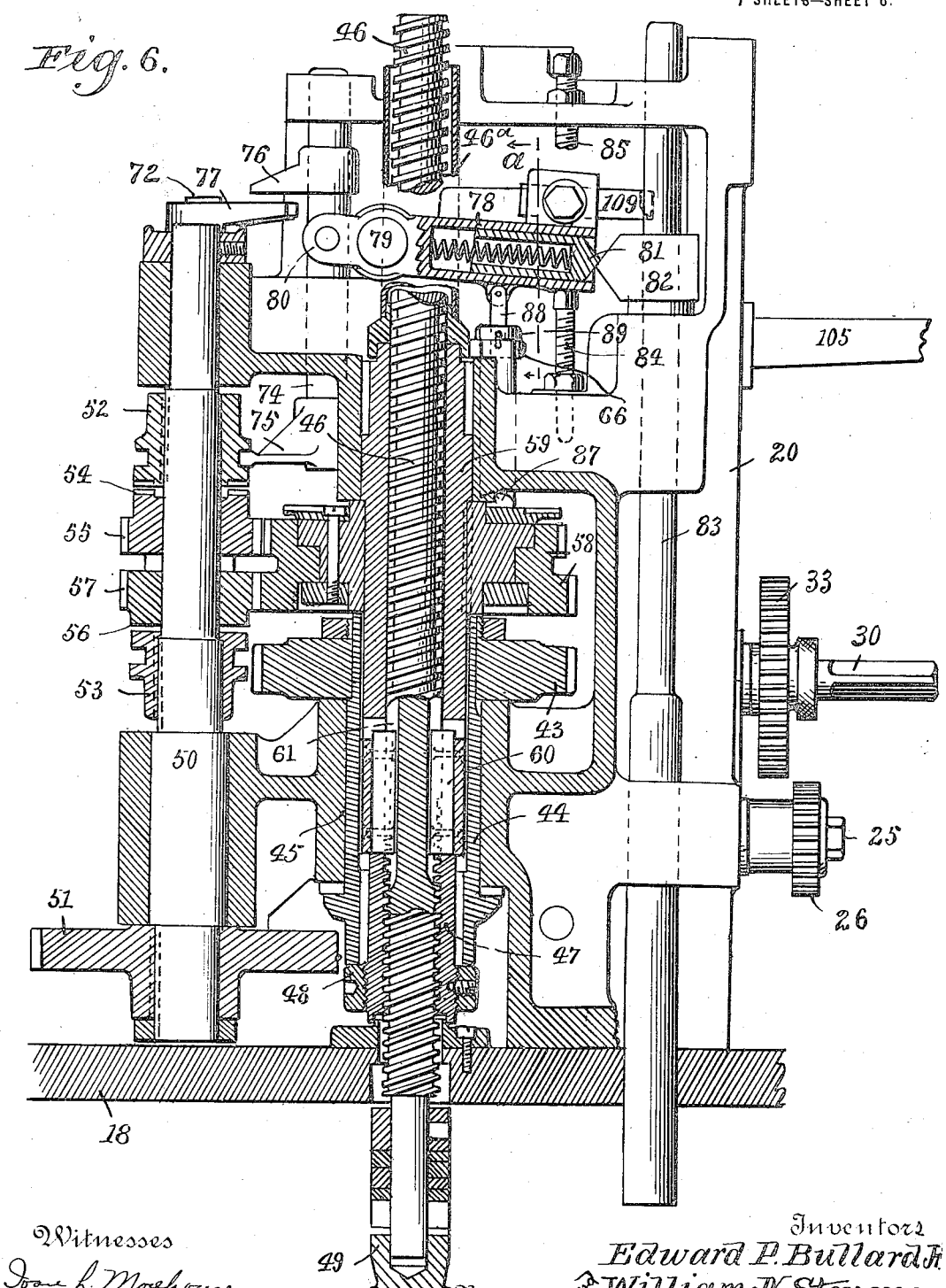
Fig. 6 shows a further vertical sectional view through the feed works taken on line 6—6 of Fig. 7.
Figure 7:
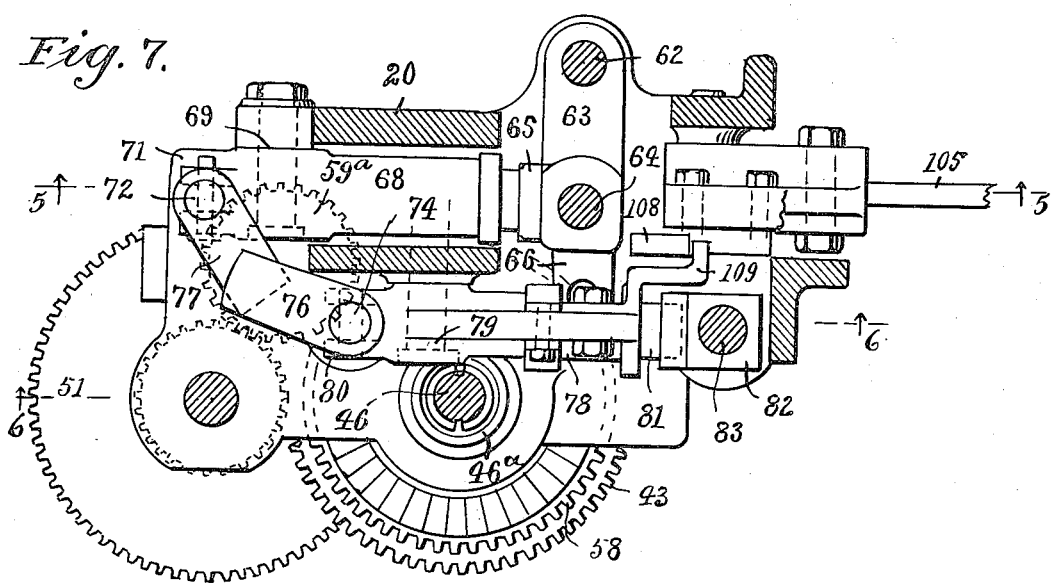
Fig. 7 is a sectional plan view of the feed works taken on line 7—7 of Fig. 4.
Figure 8:
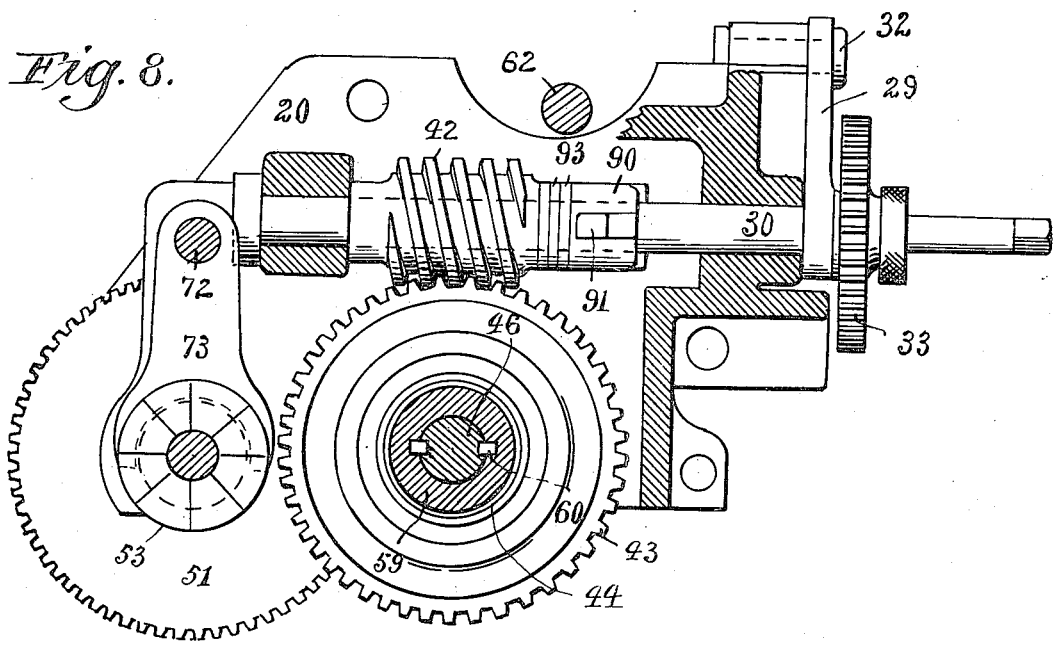
Fig. 8 illustrates a further sectional plan view of the feed works taken on line 8—8 of Fig. 4

50 represents a vertical shaft that is journaled in bearings of the frame 20 and is provided with a gear 51 for continuously driving the shaft and its movable clutch members. This driving connection is effected from a gear not shown, on the main driving shaft of the machine. To this shaft are keyed upper and lower clutch members 52 and 53 respectively,—the upper one serving to operatively engage the clutch face 54 of a small pinion 55,—while the lower slidable clutch member serves to similarly engage a clutch face 56 of a second pinion 57, all of which are operatively mounted upon the said vertical shaft 50. The lower pinion 57 meshes with and drives a double gear 58 keyed to a sleeve 59 journaled in the frame 20 and incloses a portion of the feed screw. This sleeve further extends down and operates within the before mentioned sleeve 44 to drive the screw. The upper pinion 55 serves to operate the same double gear 58, but through an idler 59ª that is mounted upon a stud secured to a part of the frame 20. Thus it will be seen that when the clutch member 58 is connected with the clutch face 54 the double pinion is driven in one direction, while if the other clutch face 56 is connected the same double pinion is driven in an opposite direction. The connection between the sleeve 59 and the feed screw is effected through keys 60 that are fitted into slots of the sleeve and riveted to the latter as shown in Fig. 6,—the inner edge portion of said keys being slidably fitted in keyways 61 of the screw. As before stated the double gear is connected to be operated in either a forward or backward direction. The forward operation is brought about through the pinion 57 and is obviously for the purpose of turning the screw and thereby quickly moving the slide down to its work when it is disengaged. The other or reverse movement of the double gear is effected through the upper clutch 53 and serves to quickly return the slide to its upper position after the cutting operations have been performed. These clutches are both automatically operated. The lower clutch 57 which serves to effect the advance or the quick upward movement of the slide is operated through a line of connections which will next be described and which are primarily operated from a portion, not shown, of the Mult-Au-Matic machine, but which directly engages and operates the advance trip rod 62 that is slidably mounted in the frame 20 and carries upon it a yoke 63, see Figs. 3 and 5, one end of said yoke being connected to the said rod and the other end to an intermediate and vertically arranged rod 64 that is also journaled in the frame 20. This connection insures a corresponding and parallel movement of the intermediate rod with the before mentioned trip rod and the said intermediate rod carries upon it, and below the yoke, an arrow point 65 and an arm 66 which will later be referred to.

This arrow point serves to engage a plunger 67 that is slidably mounted in a housing 68 and is provided with a spring to hold it extended. This housing is pivotally connected to the frame at 69 and is limited in its swinging movement by the stop screws 70 adjustably mounted in the frame. An outwardly extended fork 71 is mounted on this rod and is operatively connected to a clutch slide rod 72. The forked arm 73 mounted upon this arm is operatively connected with the groove of the clutch member 57. From this line of connection it will be apparent that a forward and upward movement of the trip rod 62 produced by a movable part, not shown, of the multiple spindle machine, will carry with it the intermediate rod 64 and its arrow point 65 until the point slips past the point of the plunger 67 thereby causing the latter to swing down and draw up on the rod 72 and its arm 73 thereby throwing the clutch 57 into engagement and bringing about the advance movement of the slide.

The outer or upper clutch 53 which serves to produce the quick return or upward movement of the slide is also operated through an arrow point and connection with the rod 83 that is tripped by the slide 14 as will be better understood from the following detail description.

Within the frame 20 is mounted a slide rod 74 which carries upon its lower end a forked arm 75 that engages the upper clutch member 53 and upon the upper end portion of the rod 74 is an arm 76 which serves to engage a similar arm 77 mounted upon the upper end of the before mentioned rod 72. These two arms are separately connected and thus serve as a safety connection for the two clutch members so that they both cannot be thrown into engagement with their respective operating members at the same instant, as for instance, in Fig. 6 the two clutch members are shown open and the two arms 76 and 77 are slightly spaced whereas if one or the other of the clutch members were engaged the said arms would likewise be brought together.

The further connection for operating the upper clutch 53 for the quick return of the slides, comprises a housing 78 that is pivotally connected to the frame at 79 and includes a fork 80 that is operatively connected to the before mentioned slide rod 74. A spring actuated plunger 81 is slidably mounted within the housing 78 and is provided with a pointed end that slidably engages the arrow point 82 mounted upon the vertically movable rod 83. The rod 83 is fitted in bearings of the frame and in practice extends down in the path of the movement of the slide 14 so as to be engaged and operated thereby. The adjustable screws 84 and 85 serve as stops for the housing carrying the plunger so as to adjust and limit its movement. It will thus be seen that the mechanisms for moving the two clutches are somewhat similar, but each are operated through an entirely different line of connections and receive their initial operation from a different part of the machine.

The double gear is operated only when it is desired to raise or lower the slide quickly, which means the moving of the slide to and from its work, but not the feeding movement of the slide. Therefore the double gears and connected mechanism are necessarily locked during the feeding movement of the slide which as before stated is produced through the before mentioned worm gear, nuts, feed screw, &c. With this in mind it will be noted that to the top of the double gear is secured a ratchet 86 whose toothed face is formed upon the top side. This ratchet therefore is designed to turn with the double gear, and in line with the movement of the teeth of this ratchet is arranged a pin 87 which normally engages the teeth of the ratchet but is disengaged by throwing in either the advance or return clutches. The detail connection with this lock pin for raising the same out of engagement with the ratchet, see Fig. 9, is made in one instance with the plunger housing 78, while in the other case it is indirectly made with the plunger 67 through the before mentioned arm 66. A link 88 which hangs from the housing 78 has its lower end pivotally connected with the top end of the pin, as shown in Figs. 6 and 9, and below this connection and upon the pin is secured a collar 89 under which the forked end of the arm 66, extends. It will thus be noted that an upward movement of the plunger housing 78 raises the link and the lock pin 87 to disengage the same from the ratchet and that an upward movement of the rod 62 with its arms 66 will perform the same function and that when both are released the pin will drop down into engagement by gravity.

In previous constructions of machine tools the tool slides are uniformly fed down or forward in their cutting operations and it is frequently the case that the cutting tools do not cut as freely as they should owing perhaps to the dullness of the tool or the hardness of the material, and this usually results in the breaking of the cutting tool, since the feed forces the tool against the stock faster than it can enter. The breakage means considerable loss as the tools are made of expensive high grade steel and as a rule are broken beyond repair.

This present form of feed works is further designed to overcome these conditions by including means whereby the pressure or load under which the slide and its cutting tool is operating may be regulated in a manner to insure the releasing of the feed mechanism and the withdrawal of the slide and cutting tool should the load become excessive, as for instance from either of the causes before mentioned. This trip mechanism is built in with the feed works and forms a part thereof as will be noted from the further description to follow.

Referring first to Fig. 5 it will be noted that the previously mentioned worm 42 is splined or keyed to its shaft so as to insure the worm turning with the shaft in a manner to permit a slight longitudinal sliding movement in the one direction, to the right, which is caused by the excessive resistance of the worm gear and its connections with the cutting tool. A collar 90 is also mounted upon this shaft and is provided with an upwardly disposed lug 91 that slidably fits between a pair of lugs 92 secured to the frame 20 so as to prevent the collar from turning. A series of washers 93 are also mounted upon the shaft between the worm and the collar to reduce the friction between the two parts. The outer edge of this collar is provided upon its two sides with a projected rib 94 that normally rests in V shaped pockets formed in the depending arms 95 of a rocker member 96. This member is pivotally hung upon the corner 97 of a shouldered shaft 98 secured in the frame and extends through an opening of said pivotal member 96 so that the latter is free to move thereon when operated through its connection with the worm. The extended top surface of this pivotal member is also provided with a groove 99 in which is seated the tapered end portion of a support 100 arranged between portions of the frame and upon a screw 101 that passes through a slot in the said support. The upper end of this support is also preferably pointed to engage a notch 102 in the base of an arm 103 that is pivoted to a shouldered shaft 104 also secured in the frame of the feed works.

The edge of this shaft, like the one previously referred to, is engaged by a notch in the base of the arm which notch is arranged to the left of the notch 102 so as to form a fulcrum for the arm between the two contacts. This arm base is arranged between the two side portions of the frame and is provided with an extension 105 that projects out from the feed works and through the sheet metal inclosures 15 of the machine. To the extreme outer end of this arm is hung a depending operating rod 106 which hangs down in position to be manually engaged should occasion require the movement of the parts to be reversed. Upon the arm 105 is mounted a weight 107 that may be adjusted to and from the fulcrum so as to regulate the amount of resistance which may be provided for the before mentioned longitudinal movement of the worm and its gear. By shifting this weight in and out and securing it in such adjusted positions, any desired load may be provided and used throughout for the same class of work and if for any reason the resistance for the cutting bar should exceed the load provided for in this manner the arm will be raised and other mechanism later to be described released so that the feeding movement of the slide will be stopped and the tool quickly withdrawn from the work.

A vertically disposed hook 108 is secured to the base of the arm 105 and serves to engage an arm 109 secured to the before mentioned plunger socket 78. This connection serves to normally limit the upward movement of the plunger and its socket when actuated by the arrowpoint, but releases the same should the weight be lifted by the resistance of the worm, thereby withdrawing the clutch pin and throwing in the clutch which produces the quick return of the slide and its cutting tool. In practice it is found that this feature is very desirable in connection with work of this sort since it insures a uniform operation upon all like pieces of work and serves as an alarm should unusually hard material be presented for operation or should the tool become defective and not properly cut.

Referring now particularly to the operation of the machine attention is first called to the fact that the feed works is disposed to be operated through the Mult-Au-Matic or other machine, to which it may be applied and in this respect several operative connections are employed for driving the feed works and tripping its mechanism. As before stated the feed works is driven through the shaft 21 and the gear 51 and each of these is provided with clutch connections for further operations of the machine. The rods 38, 62 and 83 serve as connections for tripping the feeding mechanisms and releasing and engaging the clutches whereby the power transmitted to the machine through the before mentioned shaft and gear may be employed or not as desired.

From the foregoing construction it will be understood that the clutch 24 and clutch shaft 50 are continuously driven and for the purpose of beginning the downward movement or operation of the feed slide which is first necessary to engage the clutch member 53 upon the shaft 50 to drive the double gear 58 and its sleeve connections with the feed screw so that the latter may be rapidly turned to drive down through the nut 47 to lower the tool slide in position for operation. The moment the tool slide reaches the work as suggested the rod 62 which has been previously and properly set to determine the position when the slide begins said operation is shoved down so that its arrow point is shoved past the plunger 67 and the shaft 74 and in a manner to operate the slide rod 72 and its arm 73 to disengage the before mentioned clutch 55, thus disconnecting the quick downward drive of the screw. The further operation of the feed screw is effected through the clutch 34 and its shaft 25 which would automatically be released by the preliminary downward movement of the feed slide.

These parts obviously connect with and drive the worm and gear together with the gear sleeve 44 and the nut 47 which in this instance is turned upon the screw and thus lowers it comparatively slow and which slow movement is employed through the cutting or operative feed of the slide. The minute the slide reaches its lowermost position or completes its operative movement the other trip rod 83 is engaged and shifted longitudinally so as to operate the shaft 74 its arm 75 and the upper clutch 72 thereby throwing it into engagement with the pinion, which pinion through its idler drives the upper face of the double gear in a reverse direction so as to rapidly drive the screw backward and thus quickly draw it and its attached slide away from the work. When the slide is run up in this manner and reaches its uppermost position, it strikes the spring actuated bumper 38 that shifts the clutch 54 to disengage the drive of the feed screw. At this same moment the rod 83 is again engaged in a way to release the clutch 52 and its rapid reverse drive of the feed screw.

The load carrying mechanism has already been referred to in detail and a very brief further reference to it will doubtless be sufficient to afford a proper understanding of its operation. An excessive load upon the worm gear imparted thereto by an excessive backward pressure upon the feed screw serves to slip the worm 42 upon its shaft 30 and thereby tilts the engaged rocker arm 95 hung upon the stud 98. This lifts the standard 100 and in turn raises the outer or weighted end of the arm 105 thereby releasing the clutch mechanisms which not only stops the downward movement of the feed, but also throws in the rapid reverse drive whereby the slide is withdrawn.

Having thus described our invention what we claim and desire to secure by Letters Patent is:—

1. In a feed works of the class described, the combination of a tool slide, a threaded element, a feed screw, means for quickly driving the same in a forward direction to place the slide in position for operation, means for advancing the feed screw for the feeding operation, a pivoted weighted arm for regulating the pressure under which the screw may operate, and means for rapidly driving the screw in a reverse direction to return the slide.

2. In a feed works of the class described, the combination of a tool slide, a threaded element, a feed screw connected with the element, means for quickly driving the screw in a forward direction to place the slide in position for operation, means for feeding the screw forward slowly in its feeding operation, automatic means for returning the slide to its normal position, and a pivoted weighted arm for releasing the feed of the screw when required.

3. In a feed works of the class described, the combination of a tool slide, a nut, a feed screw connected therewith, means for driving the same in a forward direction to place the slide in position for operation, means for moving the screw forward slowly in its feeding operation, and automatic means for releasing the feed and returning the screw at a predetermined time.

4. In a feed works of the class described, the combination of a tool slide, a feed screw having a keyway, a sleeve mounted thereon and having a key to engage the keyway, a nut in which the screw operates, a double gear mounted on the sleeve, means for driving the gear, sleeve and screw in either a forward or backward direction.

5. In a feed works of the class described, the combination of a feed screw having a keyway, a sleeve mounted thereon and having a key to engage the keyway, a nut in which the screw operates, a gear mounted on the sleeve, a second sleeve connected to operate the nut, driving connections for the last named sleeve and nut, and gears and clutches for operating the screw in a forward or reverse direction.

6. In a feed works of the class described, the combination of a tool slide, a feed screw, means for quickly driving the same in a forward direction to place the slide in position for operation, a nut to engage the screw, means for turning the nut to lower the screw in its feeding operation, and additional means for rotating the screw in the nut to return the screw to an upper position.

7. In a feed works of the class described, the combination of a tool slide, a feed screw connected with the slide, a sleeve mounted thereon, a gear upon the sleeve for quickly rotating the screw in a forward direction to place the slide in a position for operation, a nut in which the screw is mounted, means to drive the nut to further and slowly advance the screw in its feeding operation, and automatic means for releasing the feed and driving the screw to return the slide to its normal position.

8. In a feed works of the class described, the combination of a tool slide, a feed screw connected therewith, a bearing in which the screw is mounted, means for driving the screw in its bearings to place the slide in position for operation, means for turning the bearing to advance the screw at a reduced rate of speed for its feeding operation, automatic means for stopping the movement of the bearing, means for driving the screw in a reverse direction to return the slide, and means for automatically releasing said return drive when the slide reaches its normal position.

9. In a feed works of the class described, the combination of a feed screw, a sleeve splined thereto, a nut in which the screw operates, a double gear mounted on the sleeve, pinions to engage the double gears, clutches to engage the pinions, and means to prevent both of the clutches being thrown in at the same time.

10. In a feed works of the class described, the combination of a feed screw, a sleeve splined thereto, a second sleeve inclosing the first mentioned sleeve, a nut in which the screw operates and engaged by the second sleeve, a gear mounted on the first sleeve, a gear upon the second sleeve, clutches for operating the gear upon the first sleeve and screw in a forward and reverse direction, and means for operating the nut to lower the screw.

11. The combination with a tool head slide, of a screw for feeding the same, an adjustable weight device for determining the load under which the screw may operate in its feeding operation.

12. The combination with a tool head slide, of a screw for feeding the same, means for determining the load under which the screw may operate in its feeding operation, and means for reversing the movement of the tool slide when the load determined upon has been exceeded.

13. The combination with a tool head slide, of a feed screw for operating the slide, means for operating the feed screw, means for determining the load under which the screw may operate, and means for engaging the quick return mechanism when the load exceeds that for which the machine is set.

14. The combination with a tool head slide, of a feed screw for operating the slide, means for feeding the screw forward rapidly to position the slide, means for further feeding the screw in its feeding operation, means for releasing the said feeding mechanism when the load under which the screw is to operate is exceeded, and means for rapidly returning the screw when it had been so released.

15. The combination with a tool head slide, of a feed screw for operating the slide, means for operating the feed screw, adjustable means for determining the load under which the screw may operate, a weight and automatic trip mechanism for stopping the feeding mechanism when the load has been exceeded.

16. In a feed works of the class described, the combination of a tool slide, a feed screw, means for quickly driving the same in a forward direction to place the slide in position for operation, a nut, a sleeve and a gear for advancing the feed screw for its feeding operation, a pivoted weighted arm to determine the load under which the machine may operate, and means for rapidly driving the screw in a reverse direction to return the slide.

17. The combination with a tool slide, of a feed screw for operating the same, a worm and gear for driving the screw in one direction, a nut and sleeve for advancing the feed screw for its feeding operation, two separate drives for operating the screw in the opposite direction, and means connected with the worm for determining the load under which the screw may operate.

18. A machine of the class described, the combination with a rotatably driven member, a sleeve through which the said member is operated, two separate drives for operating the drive in the opposite direction, and a load determining device whereby the movement of the driven member is reversed when the load is exceeded.

19. In a device of the class described, for regulating the load under which a machine may operate including a longitudinally movable member, of a gear for operating the same, adjustable weight connections with the gear to determine the load of the same, and means for releasing the gear when the load is exceeded.

20. In a machine of the class described, the combination with a longitudinal movable and rotatable member, of means for moving the same forward, means for determining the load under which said member may be moved, and means for automatically rotating said member to move it in a reverse direction when the load is exceeded.

21. In a feed works of the class described, the combination with a tool slide and a feed screw, of forward and reverse driving mechanisms, clutches to engage and disengage said driving mechanisms, means connected with the clutches for operating the same by the movement of the slide and for driving the screw in a reverse direction.

22. The combination with a tool head slide, of a feed screw for operating the same, a worm and gear for driving the screw, a driven shaft, changeable gears upon the shaft, a clutch for engaging and disengaging the driven shaft and means operated by the slide to engage the clutch.

23. In a machine of the class described, the combination with a tool head slide and a feed screw for operating the same, of gears for operating the feed screw in a forward and backward direction, a ratchet mechanism for holding one gear while the other is operating, clutches through which the gears are operated, and trip mechanism for simultaneously operating the ratchet and clutch.

24. In a feed works of the class described, the combination of a tool slide, a threaded element, a feed screw connected with the slide, means for quickly driving the same in a forward direction to place the slide in position for operation, means for feeding the screw forward slowly in its feeding operation, a ratchet device for holding the driving mechanism while the slow feed is in operation, and automatic means for releasing the ratchet and returning the slide to its normal position.

25. In a feed works of the class described, the combination of a tool slide, a feed screw for operating the slide, a sleeve upon the screw, a gear upon the sleeve, clutches through which the gear, screw and sleeve are operated, means for driving the same in a forward direction, a trip rod, a pivotal member, a yieldable plunger intermediate the rod and clutches for operating the latter to release the feed and drive the screw to return the slide, and means for automatically releasing said return drive at a predetermined time.

26. In a device of the class described, for regulating the load under which a machine may operate, including a longitudinally movable member, of a gear for operating the same, a driven shaft, a slidable worm upon the shaft for operating the gear, a collar upon the shaft and seated against the worm, an adjustable weight connection with the collar to determine the load under which the worm may rotate and means for releasing the driven shaft when the load is exceeded.

27. In a machine of the class described, the combination with a longitudinal movable and rotatable feed shaft, of means for rotating the same to move it forward, means for moving the shaft forward bodily, mechanism for regulating the load under which said shaft may be operated, and means for automatically rotating said member to move it in a reverse direction when the load is exceeded.

28. In a feed works of the class described, the combination of a tool slide, a threaded element, a feed screw, two power driving connections, clutches for connecting and disconnecting said drives, a pivoted arm and weight for operating the clutches, connections from one of said driving shafts for quickly driving the screw in a forward and reverse direction, and means for advancing the feed screw for its feeding operation.

29. In a feed works of the class described, the combination of a tool slide, a threaded element, a feed screw, two power driving connections, clutches for connecting and disconnecting said drives, connections from one of said driving shafts for quickly driving the screw in a forward and reverse direction, means for lowering the feed screw for its feeding operation, and means for determining the load under which the feeding operation may operate.

30. The combination with a tool head slide, of a feed screw for operating the slide, mechanism for operating the feed screw in both a forward and reverse direction, means for determining the load under which the screw may operate in a forward direction, and means connected with the load determining means for releasing the feeding mechanism when the load exceeds that for which the machine is set.

31. The combination with a tool head slide, of a feed screw for operating the slide, a driving shaft for operating the screw, clutches thereon for operating the feed screw, trip rods, connections from one rod to operate one of the clutches, connections from the other rod for operating the second clutch, means for releasing the said feed screw operating mechanism when the load under which the screw is to operate is exceeded, and means for rapidly returning the screw when it has been so released.

32. In a feed works of the class described, the combination of a tool slide, a feed screw connected with the slide, means for quickly rotating the screw in both a forward and reverse direction to move the slide to and from its work, a nut in which the screw is mounted, a sleeve in which the nut is splined to further lower the screw in its feeding operation, and mechanism for engaging the reverse drive for the screw to return the slide to its normal position.

33. In a feed works of the class described, the combination of a feed screw, a sleeve splined thereto, a nut in which the screw operates, a second sleeve engaging the nut, a gear mounted on the first sleeve, a ratchet for holding the gear, automatic means for engaging and disengaging the ratchet, a gear upon the second sleeve, clutches for operating the gear upon the first sleeve and screw in a forward and reverse direction, and means for operating the nut to advance the screw.

34. The combination with a tool head slide, of a screw for feeding the same, and a pivoted arm and weight connected with the feed screw for determining the load under which the screw will operate in its feeding operation.

35. In a feed works of the class described, the combination with a tool slide and a feed screw, of forward and reverse screw driving mechanisms, clutches to engage and disengage said mechanisms, slidable rods for operating the clutches, spring actuated and pivotal members connected with the rods and clutches, slide rods, and means upon the rods to engage the spring actuated members to tilt the same by a longitudinal movement of the rods.

36. In a machine of the class described, the combination with a tool head slide, of a feed screw for operating the same, a sleeve splined thereto, gears mounted upon the feed screw, means for operating the gear to drive the screw in a forward and backward direction, a second sleeve mounted on the first mentioned sleeve, a gear upon the second sleeve, clutches through which the last named gear is operated, a nut connected to the second sleeve and threadably engaging the feed screw.

37. The combination with a tool head slide, of a feed screw for operating the same, a worm and gear for driving the screw, changeable gears for driving the shaft, means to weigh the load under which the gear and screw operates.

38. In a feed works of the class described, the combination of a tool slide, a feed screw, clutches for connecting and disconnecting the power for the feed screw, means for weighing the load under which the screw may operate, connections with said weighing device for shifting the clutch to release and reverse the drive of the feed screw.

39. In a feed works of the class described, the combination of a feed screw, a driving shaft, clutches for connecting and disconnecting said driving shaft, a slide rod connected to operate one of the clutches, a second slide rod and connections for operating a second clutch, connections between the two rods to prevent both clutches being engaged at the same time, and separate automatic trip mechanism for operating each rod and its clutch.

40. In a feed works of the class described, the combination of a tool slide, a feed screw connected with the slide, means for quickly rotating the screw in both a forward and reverse direction to move the slide to and from its work, a nut in which the screw is mounted, means to turn the nut to further advance the screw in its feeding operation, automatic means for releasing the nut, mechanism for connecting the reverse drive for the screw to return the slide to its normal position and means for disconnecting said reverse drive when the tool slide has been returned.

Signed at Bridgeport in the county of Fairfield and State of Conn., this 29th day of December, A. D. 1915.

EDWARD P. BULLARD, Jr.
WILLIAM N. STEVENS.

Witnesses:
J. D. McLeod,
J. H. Van York, Jr.